(12) United States Patent
Moon et al.

(10) Patent No.: US 11,249,599 B2
(45) Date of Patent: Feb. 15, 2022

(54) ULTRASONIC SENSOR AND DISPLAY DEVICE

(71) Applicant: LG Display Co., Ltd., Seoul (KR)

(72) Inventors: TaeHyoung Moon, Paju-si (KR); JaeHyun Kim, Paju-si (KR); SungJin Lee, Paju-si (KR); DeukHo Yeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/897,079

(22) Filed: Jun. 9, 2020

(65) Prior Publication Data
US 2020/0393921 A1 Dec. 17, 2020

(30) Foreign Application Priority Data
Jun. 17, 2019 (KR) .......................... 10-2019-0071814

(51) Int. Cl.
*G06F 3/043* (2006.01)
*G06F 3/041* (2006.01)

(52) U.S. Cl.
CPC ............ *G06F 3/043* (2013.01); *G06F 3/0412* (2013.01)

(58) Field of Classification Search
CPC .................. G06F 3/043; G06F 3/0416; G06F 2203/04106; G06F 3/0436; G06F 3/0412; G06F 2203/04105; G06F 3/017; G06F 3/016; G06F 3/042; G06F 3/0488; G06F 3/0418; G06F 3/044; G06F 3/045
See application file for complete search history.

(56) References Cited

U.S. PATENT DOCUMENTS

| | | | | |
|---|---|---|---|---|
| 2007/0024546 A1* | 2/2007 | Jang | ..................... | G06K 9/0002 345/78 |
| 2014/0240405 A1* | 8/2014 | Furuya | ................... | B41J 2/1645 347/71 |
| 2014/0352440 A1* | 12/2014 | Fennell | .................. | G01N 29/22 73/632 |
| 2014/0354597 A1* | 12/2014 | Kitchens, II | ............ | G06F 3/043 345/175 |
| 2014/0355376 A1* | 12/2014 | Schneider | ............... | G01S 15/02 367/7 |
| 2015/0241393 A1* | 8/2015 | Ganti | ..................... | G01N 29/09 73/589 |
| 2016/0096368 A1* | 4/2016 | Yazaki | ................... | B41J 2/1632 347/70 |
| 2016/0107194 A1* | 4/2016 | Panchawagh | ......... | G01S 7/5208 367/140 |
| 2018/0046836 A1* | 2/2018 | Hinger | ................. | G06K 9/0002 |
| 2018/0287046 A1* | 10/2018 | Hirai | ..................... | B06B 1/0207 |
| 2019/0065806 A1* | 2/2019 | Cheng | .................... | H01L 33/58 |

* cited by examiner

*Primary Examiner* — Olga V Merkoulova
(74) *Attorney, Agent, or Firm* — Fenwick & West LLP

(57) ABSTRACT

An ultrasonic sensor and a display device is disclosed where a piezoelectric material disposed in each pixel area of the ultrasonic sensor is formed to have various thicknesses, or an electrode driving the piezoelectric material disposed in each pixel area has various areas, thereby providing the ultrasonic sensor that generates ultrasonic waves in various frequency bands. Accordingly, it can expand the frequency band of the ultrasonic waves generated by the ultrasonic sensor to improve its sensing performance, and obtain information of various frequency bands to provide the ultrasonic sensor capable of both the fingerprint sensing and the proximity sensing.

20 Claims, 15 Drawing Sheets

ULTRASONIC SENSOR AND DISPLAY DEVICE

CROSS-REFERENCE TO RELATED APPLICATION

This application claims priority from Republic of Korea Patent Application No. 10-2019-0071814, filed on Jun. 17, 2019, which is hereby incorporated by reference in its entirety.

BACKGROUND

Field

Embodiments of the present disclosure relate to an ultrasonic sensor and a display device.

Description of Related Art

As with the development of the information society in the recent years, demand for display devices for displaying images is increasing, and in turn, various types of display devices, such as, for example, liquid crystal display (LCD) devices or organic light emitting display (OLED) devices, have recently come into widespread use.

Such display devices may be adapted to recognize the user's touch of a display panel thereof or recognize the user's biometric information (e.g., fingerprints) or gestures either in contact with or coming close to the display panel, and then perform a series of input processing based on the recognized information, thereby providing the user with a variety of desired functions.

For recognition of such biometric information, as an example, an optical sensor or the like may be used, but in case where the optical sensor is disposed in a bezel area of the display panel, there still remains a problem that its active area is narrowed. Furthermore, in the case where the optical sensor is disposed in the active area, another problem may be that the optical sensor may affect a display driving capability or degrade the accuracy of sensing on the display panel.

Accordingly, there is a need for a solution capable of significantly improving the performance of fingerprint sensing or proximity sensing in the active area, while reducing a reduction in size of the active area of the display panel.

SUMMARY

Embodiments of the present disclosure provide an ultrasonic sensor that can generate ultrasonic waves in a wide range of frequency bands and sense information in the wide range of frequency bands.

Embodiments of the present disclosure provide an ultrasonic sensor capable of sensing biometric information in contact with a display panel and gestures performed in proximity to the display panel, and a display device including such an ultrasonic sensor.

According to an aspect, embodiments of the present disclosure provide an ultrasonic sensor comprising a substrate; a plurality of thin film transistors, each of the plurality of thin film transistors disposed in corresponding one of a plurality of areas on the substrate; a planarization layer disposed on the plurality of thin film transistors, the planarization layer including a plurality of holes; a plurality of first electrodes, each of the plurality of first electrodes disposed in a corresponding one of the plurality of areas on the planarization layer and electrically connected to a corresponding one of the plurality of thin film transistors through a corresponding one of the plurality of holes; a piezoelectric material disposed on the planarization layer and the plurality of first electrodes, the piezoelectric material including a first portion in a first area from the plurality of areas and a second portion in a second area from the plurality of areas where the first portion and the second portion are non-overlapping with one of the plurality of holes that is disposed in the first area and the second area, the first portion having a first thickness and the second portion having a second thickness that is less than the first thickness; and at least one second electrode disposed on the piezoelectric material.

In another embodiment, an ultrasonic sensor comprises: a plurality of first electrodes, each of the plurality of first electrodes disposed in a corresponding one of a plurality of areas; at least one second electrode disposed on the plurality of areas; and a piezoelectric material disposed between the plurality of first electrodes and the second electrode, wherein an area of a first portion of the second electrode disposed in a first area of the plurality of areas is smaller than an area of a second portion of the second electrode disposed in a second area of the plurality of areas, and an area of a first one of the plurality of first electrodes that is disposed in the first area is substantially the same as an area of a second one of the plurality of first electrodes disposed in the second area.

In one embodiment, a display device comprises: a display panel; and an ultrasonic sensor equipped within the display panel or disposed on at least one surface of the display panel, the ultrasonic sensor comprising: a substrate; a plurality of thin film transistors, each of the plurality of thin film transistors disposed in corresponding one of a plurality of areas on the substrate; a planarization layer disposed on the plurality of thin film transistors, the planarization layer including a plurality of holes; a plurality of first electrodes, each of the plurality of first electrodes disposed in a corresponding one of the plurality of areas on the planarization layer and electrically connected to a corresponding one of the plurality of thin film transistors through a corresponding one of the plurality of holes; a piezoelectric material disposed on the planarization layer and the plurality of first electrodes, the piezoelectric material including a first portion in a first area from the plurality of areas and a second portion in a second area from the plurality of areas where the first portion and the second portion are non-overlapping with one of the plurality of holes that is disposed in the first area and the second area, the first portion having a first thickness and the second portion having a second thickness that is less than the first thickness; and at least one second electrode disposed on the piezoelectric material.

In one embodiment, an ultrasonic fingerprint sensor comprises: a substrate; a first thin film transistor disposed in a first area of the substrate; a second thin film transistor disposed in a second area of the substrate; a plurality of first electrodes including a first one of the plurality of first electrodes and a second one of the plurality of first electrodes, the first one of the plurality of first electrodes in the first area and electrically connected to the first thin film transistor, and the second one of the plurality of first electrodes disposed in the second area and electrically connected to the second thin film transistor; a piezoelectric material on the plurality of first electrodes; and at least one second electrode on the piezoelectric material; wherein the ultrasonic fingerprint sensor is configured to generate a first frequency band of ultrasonic wave to sense a fingerprint of a finger in the first area and a second frequency band of ultrasonic wave to sense a proximity of the finger in the second area responsive to a voltage applied to the plurality of first electrodes and a voltage applied to the second electrode.

Therefore, the ultrasonic sensor can generate ultrasonic waves in various frequency bands and sense information in various frequency bands, thereby improving in use the sensing performance of the ultrasonic sensor and allowing the ultrasonic sensor to provide the fingerprint sensor function and the proximity sensor function simultaneously.

BRIEF DESCRIPTION OF THE DRAWINGS

The above and other objects, features, and advantages of the present disclosure will be more clearly understood from the following detailed description, by way of examples, taken in conjunction with the accompanying drawings, in which.

DETAILED DESCRIPTION

Figure 1:
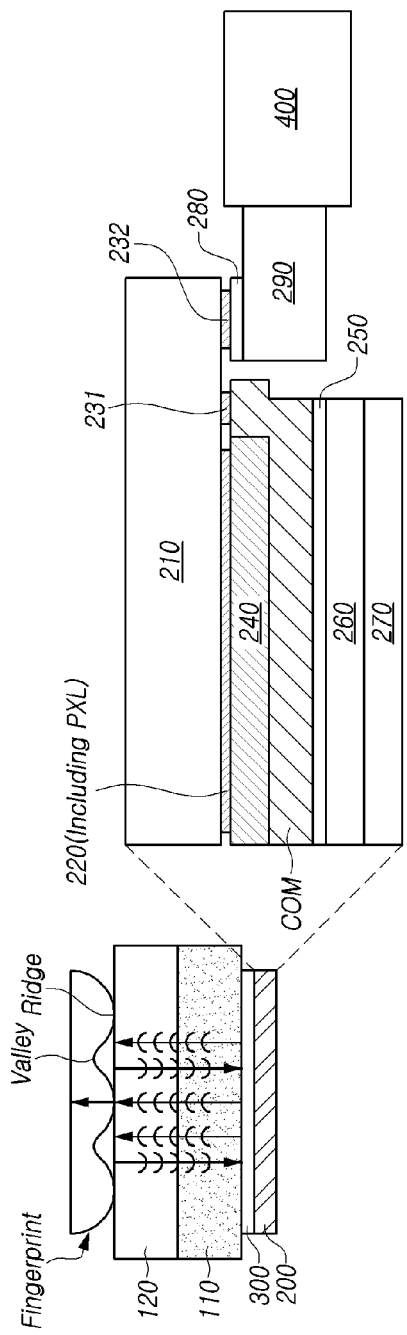
FIG. 1 illustrates a schematic configuration of a display device in which an ultrasonic sensor is disposed, according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a schematic structure of a display device in which an ultrasonic sensor 200 according to embodiments of the present disclosure is disposed.

Referring first to FIG. 1, the display device may include a display panel 110 in which a plurality of gate lines, a plurality of data lines and a plurality of subpixels are arranged, and various driving circuits for driving signal lines or voltage lines disposed in the display panel 110.

On at least one surface of the display device may be disposed the ultrasonic sensor 200 or an ultrasonic sensing unit for sensing biometric information (e.g., a fingerprint) or a gesture that come into contact with or close to the display panel 110.

Alternately, on some occasions, the ultrasonic sensor 200 may be disposed in a form embedded into the display device.

When the ultrasonic sensor 200 is disposed on one surface of the display device, for example, cover glass 120 may be disposed on a surface for displaying an image in the display panel 110. Further, the ultrasonic sensor 200 may be disposed on the opposite side of the surface on which the image is displayed in the display panel 110. That is, the ultrasonic sensor 200 may be disposed on a surface opposite to the surface on which the cover glass 120 is disposed on the display panel 110.

The ultrasonic sensor 200 may be bonded to the display panel 110 via an adhesive portion 300, wherein the adhesive portion 300 may be formed of, for example, resin.

The ultrasonic sensor 200 generates ultrasonic waves and then senses the ultrasonic waves reflected by fingerprints contacting the cover glass 120 disposed on the display panel 110, so that it can recognize the fingerprints contacting the cover glass 120. Here, the ultrasonic sensor 200 that may be disposed on the opposite side of the surface on which the image is displayed on the display panel 110 performs sensing of the ultrasonic waves, thereby enabling the fingerprint recognition without reducing the area where the image is displayed.

More specifically, when the ultrasonic waves generated by the ultrasonic sensor 200 reach a valley portion of the fingerprint, they come into contact with the air existing between skin of the user's finger and the cover glass 120. Here, due to the difference in the acoustic impedance value between the cover glass 120 and the air, most of the ultrasonic waves hitting the air are reflected.

Then, when the ultrasonic waves generated by the ultrasonic sensor 200 reach a ridge portion of the fingerprint, they come into contact with the skin of a person in contact with the cover glass 120. Here, although part of the ultrasonic waves may be reflected, most of the ultrasonic waves are transmitted into the skin to be then reflected away inside the skin.

Accordingly, based on the intensity and timing of the ultrasonic waves that reach the valley portions and the ridge portions of the fingerprints and are then reflected therefrom, those valley portions and ridge portions of the fingerprints can be distinguished and the fingerprints can be then sensed.

As apparent from the foregoing, the ultrasonic sensor 200 typically uses a scheme capable of sensing up to the inside of the skin, so it is not sensitive to a degree of the contamination or condition of the skin surface and provides an advantage of better security as well. In addition, the ultrasonic sensor makes it possible for the fingerprints to be sensed without reducing the area where the image is displayed on the display panel 110, so that the display device can effectively perform input processing using the sensed fingerprint.

The ultrasonic sensor 200 may further include a material for generating ultrasonic waves and various circuit elements for generating and sensing the ultrasonic waves.

For example, the ultrasonic sensor 200 may include a substrate 210, a thin film transistor array 220 disposed on the substrate 210, a first pad portion 231, and a second pad portion 232. Further, the thin film transistor array 220 may include a pixel electrode PXL disposed in each pixel, and a piezoelectric material 240 and a common electrode COM may be sequentially arranged in the thin film transistor array 220.

The piezoelectric material 240 may be formed of, for example, PZT, ZnO, perovskite, or the like, although not limited thereto.

The common electrode COM may be bonded to a reflective layer 260 via an adhesive layer 250, and a cover layer 270 may be disposed on the reflective layer 260.

A controller 400 for supplying signals, voltages, etc. to the thin film transistor array 220, the common electrode COM and the like may be electrically connected to the second pad portion 232 disposed on the substrate 210, through a flexible printed circuit 290 and a bonding portion 280.

In the thin film transistor array 220 may be disposed a transistor for generating ultrasonic waves and sensing the ultrasonic waves reflected by fingerprints, a pixel electrode PXL, and so on.

Figure 2:
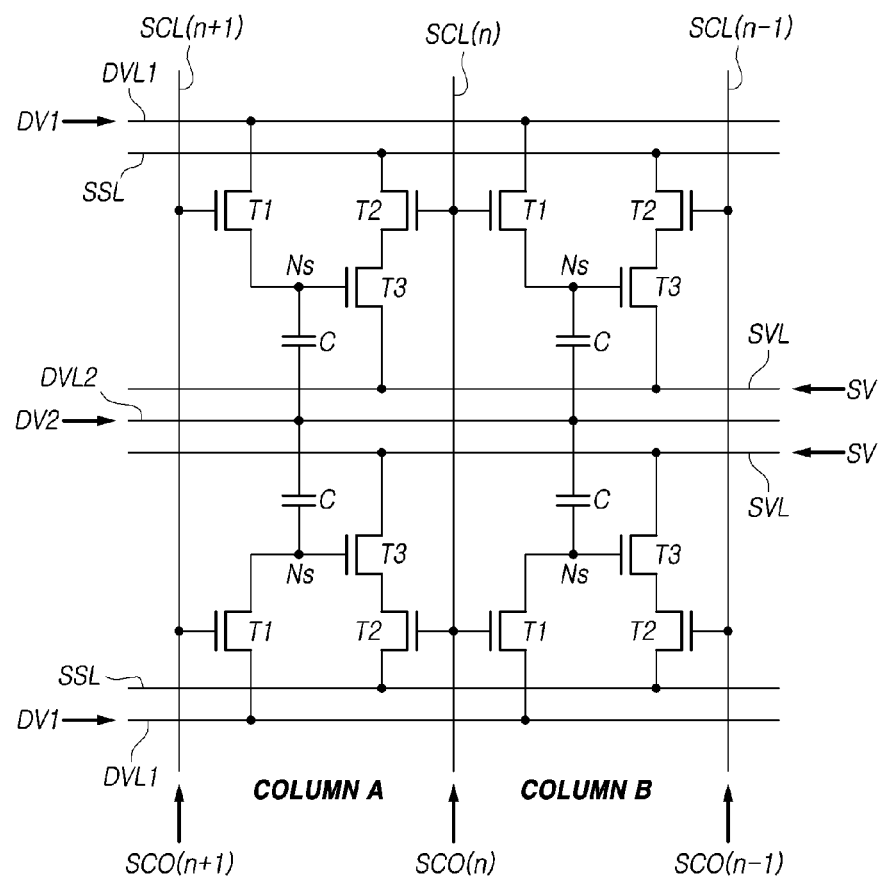
FIG. 2 illustrates an example of a circuit configuration and a driving scheme in a pixel array of an ultrasonic sensor according to embodiments of the present disclosure.

The pixel electrode PXL disposed on the thin film transistor array 220 may form the common electrode COM and a capacitor C (as shown in FIG. 2).

In addition, the ultrasonic waves can be generated by vibrating the piezoelectric material 240 with a voltage applied to the pixel electrode PXL and a voltage applied to the common electrode COM disposed on the thin film transistor array 220.

The thin film transistor array 220 including the pixel electrode PXL, the piezoelectric material 240, and the common electrode COM may be considered as a pixel array in view of the circuitry.

The common electrode COM may be disposed, for example, using a method of coating silver (Ag) ink, and in some occasions, may be disposed either in a form of covering the entire piezoelectric material 240, or in a regular pattern.

The reflective layer 260 may be formed of, for example, copper, and may serve to have the ultrasonic waves reflected from the fingerprints reflected back to the thin film transistor array 220.

The cover layer 270 may be formed of, for example, polyimide, and may provide a function of capping the pixel array and the reflective layer 260 of the ultrasonic sensor 200.

On some occasions, the reflective layer 260 and the cover layer 270 may be disposed in a form of single film, or may be implemented in a form in which any organic material or a dielectric material, etc. is coated on the common electrode COM.

The signals and voltages for driving the pixel array may be supplied from the controller 400. Alternatively, on some occasions, signals that do not require high voltage may be supplied from a driving circuit arranged for driving the display panel 110.

FIG. 2 illustrates an example of a circuit structure and a driving scheme in a pixel array of an ultrasonic sensor 200 according to embodiments of the present disclosure.

Referring to FIG. 2, a plurality of scan lines SCL and a plurality of sensing lines SSL may be disposed in the pixel array of the ultrasonic sensor 200. The scan lines SCL and the sensing lines SSL may be disposed to intersect each other, and a plurality of pixels may be disposed in an area defined by intersection of the scan lines SCL and the sensing lines SSL.

Further, a voltage line for supplying a driving voltage DV, a sensing voltage SV and so on, for use in generation and sensing of the ultrasonic waves of pixels may be disposed in the pixel array.

The ultrasonic sensor 200 may further include a circuit for driving the plurality of scan lines SCL disposed in the pixel array, and a circuit for detecting a sensing signal through the plurality of sensing lines SSL.

Several circuit elements for generating and sensing the ultrasonic waves may be disposed in each pixel.

For example, each pixel may be provided with a first transistor T1 and a second transistor T2, both of which are controlled by a scan signal SCO applied to the scan line SCL, a third transistor T3 controlled by a voltage at a sensing node Ns, and at least one capacitor C.

Here, the first transistor T1, the second transistor T2, and the third transistor T3 are all illustrated as N-type, but on some occasions, all of them may be implemented as P-type. Alternatively, only the first transistor T1 and the second transistor T2 may be implemented with the same type, and the third transistor T3 may be implemented with a different type.

The first transistor T1 may be controlled by the scan signal SCO applied to the scan line SCL and may be electrically connected between a first driving voltage line DVL1 and the sensing node Ns.

Here, the first driving voltage line DVL1 may supply to pixels a first driving voltage DV1 for generating the ultrasonic waves. The first driving voltage DV1 may be an AC voltage in the form of a pulse having a high level of voltage, for example, an AC voltage swinging from +100V to −100V. Alternatively, on some occasions, the first driving voltage DV1 applied to the first driving voltage line DVL1 may be a constant voltage.

The second transistor T2 may be controlled by the scan signal SCO applied to the scan line SCL, and may be electrically connected between the sensing line SSL and the third transistor T3.

Here, the second transistor T2 may be driven by the same scan line SCL as the scan line SCL driving the first transistor T1 disposed in an adjacent pixel.

In other words, as illustrated in FIG. 2, the first transistor T1 disposed in the pixel of column B and the second transistor T2 disposed in the pixel of column A may be coupled to the same n-th scan line SCL(n) to be simultaneously driven by the n-th scan signal SCO(n) applied to the n-th scan line SCL(n).

The third transistor T3 may be controlled depending upon a voltage level of the sensing node Ns, and may be electrically connected between a sensing voltage line SVL and the second transistor T2.

Further, the sensing voltage SV applied to the sensing voltage line SVL may be a constant voltage.

The capacitor C may be electrically connected between the sensing node Ns and a second driving voltage line DVL2.

That is, the electrode of the capacitor C connected to the sensing node Ns may be a pixel electrode PXL that is disposed on the thin film transistor array 220 to form a capacitance. Further, the electrode of the capacitor C connected to the second driving voltage line DVL2 may be a common electrode COM.

This common electrode COM may be an electrode commonly connected to two or more pixels.

The second driving voltage line DVL2 may supply the second driving voltage DV2 for generating the ultrasonic waves to pixels.

Further, the second driving voltage DV2 may be a constant voltage lower than the maximum voltage of the first driving voltage DV1. Alternatively, on some occasions, the second driving voltage DV2 may be a pulsed AC voltage, when the first driving voltage DV1 is a constant voltage.

The scan signals SCO are sequentially applied to the scan lines SCL arranged in the pixel array, so that the generation and sensing of ultrasonic waves can be efficiently performed.

For example, when the n-th scan signal SCO(n) in a level of turning on the first transistor T1 is applied via the n-th scan line SCL (n), the first transistor T1 disposed in a pixel in column B is turned on.

Thus, the first transistor T1 disposed in the pixel in column B is turned on, so the first driving voltage DV1 is applied to the sensing node Ns of the pixel in column B.

Then, as a pulsed high voltage and a low constant voltage are applied to both electrodes of the capacitor C, the piezoelectric material 240 disposed between both electrodes of the capacitor C is allowed to vibrate to generate the ultrasonic waves.

That is, the ultrasonic waves may be generated in pixels arranged in column B when the first transistor T1 is turned on.

At this time, the n-th scan signal SCO (n) in a level of turning on the first transistor T1 is applied to the n-th scan line SCL (n), so the second transistors T2 disposed in the pixels of column A are also turned on.

Further, while the first transistor T1 disposed in the pixels of column A is turned off, the ultrasonic waves reaching the column A reflected by the fingerprint can cause the voltage level at the sensing node Ns of the pixel arranged in column A to change.

In other words, the reflected ultrasonic waves can change the polarization state of the piezoelectric material 240 disposed between the common electrode COM and the pixel electrode PXL disposed in the pixel of column A, so that the voltage level at the pixel electrode PXL, that is, the sensing node Ns can be changed.

As the voltage level at the sensing node Ns of the pixel arranged in column A changes, the third transistor T3 may be turned on/off. Further, as the second transistor T2 is turned on, the sensing voltage SV can be detected through the sensing line SSL.

In other words, it is possible to sense the ultrasonic wave reflected back from the fingerprint in the pixel of column A in which the second transistor T2 is turned on.

As described above, the generation and sensing of the ultrasonic waves in an adjacent pixel column can be accomplished by driving the first transistor T1 and the second transistor T2 disposed in the adjacent pixel column with the same scan line SCL.

Figure 3:
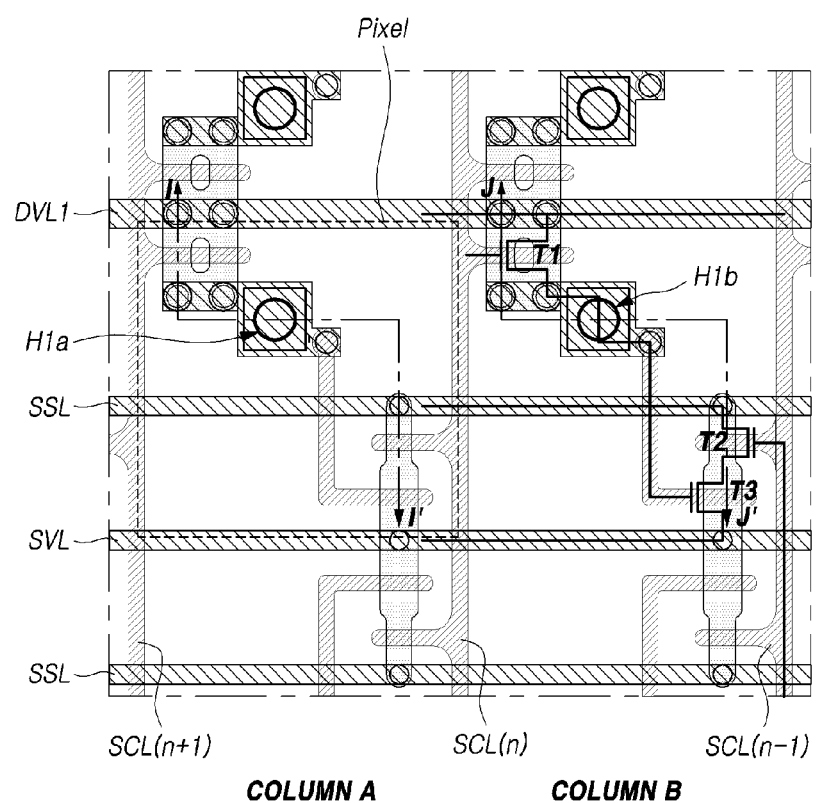
FIG. 3 illustrates an example of a planar configuration for a thin film transistor array of an ultrasonic sensor according to embodiments of the present disclosure.
Figure 4:
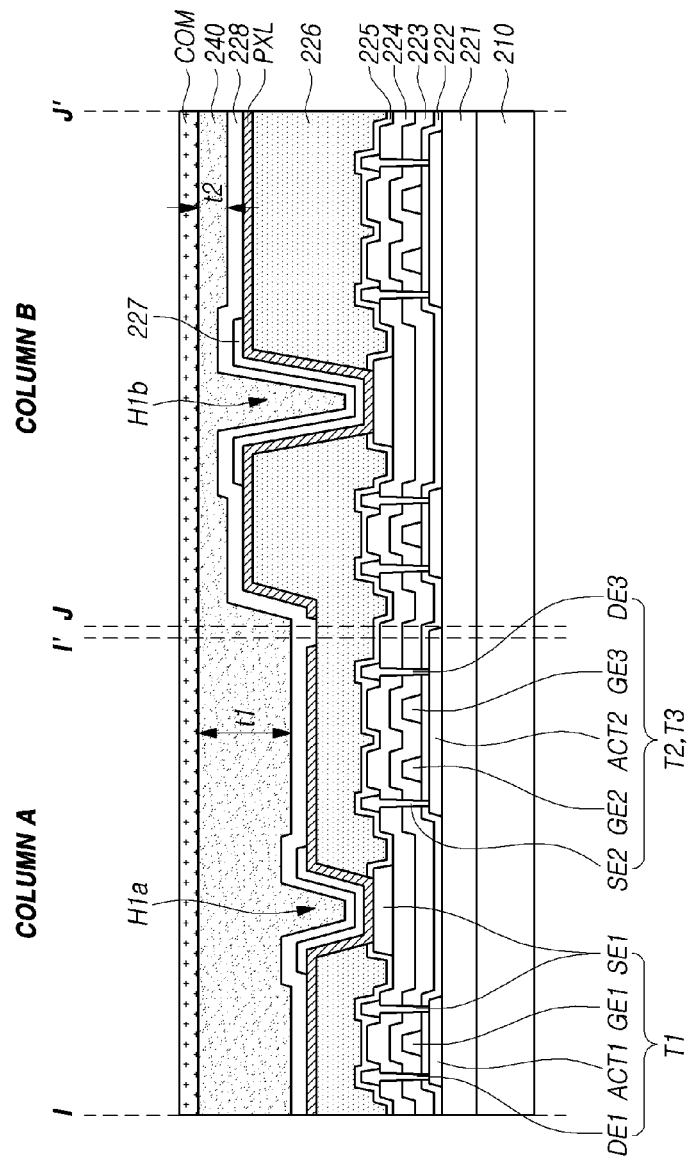
FIG. 4 illustrates a view of a cross-sectional structure of I-I' and J-J' portions in the thin film transistor array as illustrated in FIG. 3 according to embodiments of the present disclosure.

FIG. 3 illustrates an example of a planar structure for a thin film transistor array 220 of an ultrasonic sensor 200 according to embodiments of the present disclosure. Further, FIG. 4 shows a cross-sectional view of I-I' and J-J' portions of the thin film transistor array 220 as illustrated in FIG. 3.

Referring to FIG. 3, it is seen that the scan line SCL may be arranged in one direction in the thin film transistor array 220, and the first driving voltage line DVL1, the sensing voltage line SVL, the sensing line SSL, and the like may be arranged in a direction intersecting with the scan line SCL.

Furthermore, a plurality of pixels may be arranged in the thin film transistor array 220, wherein one pixel may be defined, for example, in a region between the first driving voltage line DVL1 and the sensing voltage line SVL of regions between the scan lines SCL.

Each pixel may include the first transistor T1, the second transistor T2, and the third transistor T3. Further, holes H1a and H1b may be disposed for electrical connection to the pixel electrode PXL and the transistors.

The piezoelectric material 240, the common electrode COM and the like may be disposed on the pixel electrode PXL to configure a piezoelectric element that performs the generation and sensing of the ultrasonic waves.

Here, the piezoelectric material 240 configuring the piezoelectric element may be disposed in various thicknesses in each pixel.

As an example, the thickness of the piezoelectric material 240 disposed in the pixel in column A may be different from the thickness of the piezoelectric material 240 disposed in the pixel in column B.

Typically, as the thickness of the piezoelectric material 240 is inversely proportional to the frequency of ultrasonic waves generated from vibration of the piezoelectric material 240, the piezoelectric material 240 may be arranged in various thicknesses in order to generate ultrasonic waves in various frequency bands. In other words, the frequency of ultrasonic waves generated by vibration of the piezoelectric element may be proportional to the area (or width, diameter, etc.) of the electrode to which the voltage driving the piezoelectric element is applied, while it may be inversely proportional to the thickness of the piezoelectric material 240 disposed between the electrodes. Thus, according to embodiments of the present disclosure, the piezoelectric material 240 is allowed to have various thicknesses, so that the generated ultrasonic waves may have various frequencies depending upon the thickness of the piezoelectric material 240 disposed in the pixel.

Therefore, the performance of sensing in the ultrasonic sensor 200 can be significantly improved by extending the frequency band of the ultrasonic waves generated by the ultrasonic sensor 200 to obtain information in the various frequency bands.

Referring to FIG. 4, it is seen that the thickness of the piezoelectric material 240 disposed in pixels in column A is t1, and the thickness of the piezoelectric material 240 disposed in pixels in column B is t2, wherein t2 may be smaller than t1. Here, t1 and t2 may stand for the thickness of the piezoelectric material 240 disposed in an area other than the area where the holes H1a and H1b are disposed.

As the thickness of the piezoelectric material 240 disposed in the pixels in column A and the thickness of the piezoelectric material 240 disposed in the pixels in the column B are different from each other, the ultrasonic waves may be generated in various frequency bands. Further, the thickness of the piezoelectric material 240 disposed in the pixels in column A and the thickness of the piezoelectric material 240 disposed in the pixels in column B may be controlled by the thickness of the planarization layer 226 disposed underneath the piezoelectric material 240.

More specifically, the thin film transistor array 220 may further include a buffer layer 221 disposed on the substrate 210.

Active layers ACT1 and ACT2 forming the transistors T1, T2, and T3 may be disposed on the buffer layer 221, and a gate insulating layer 222 may be disposed on the active layers ACT1 and ACT2.

Gate electrodes GE1, GE2, and GE3 may be disposed on the gate insulating layer 222, and a first insulating layer 223, a second insulating layer 224 and the like may be arranged on the gate electrodes GE1, GE2, and GE3. On some occasions, the first insulating layer 223 and the second insulating layer 224 may be disposed in either a single insulating layer or a plurality of insulating layers.

Source electrodes SE1 and SE2 and drain electrodes DE1 and DE3 may be disposed on the second insulating layer 224 to be connected to the active layers ACT1 and ACT2. Here, the second transistor T2 and the third transistor T3 may be formed in such a structure that, for example, only the gate electrodes GE2 and GE3 are separated, while the source electrode SE2, the drain electrode DE3, and the active layer ACT2 are shared, although not limited thereto.

A first protective layer 225 may be disposed on the source electrodes SE1 and SE2 and the drain electrodes DE1 and DE3, and a planarization layer 226 may be disposed on the first protective layer 225.

Here, the planarization layer 226 may be formed so that a thickness of the planarization layer 226 disposed in the pixels of column A and a thickness of the planarization layer 226 disposed in the pixels of column B are different from each other. As an example, the thickness of the planarization layer 226 disposed in the pixels of column A may be smaller than the thickness of the planarization layer 226 disposed in the pixels of column B.

The planarization layer 226 with different thicknesses according to the pixels may be formed through a process of disposing the planarization layer 226 using a half-tone mask or a process of disposing the planarization layer 226 two times. Further, depending on the case, the planarization layer 226 may be formed with at least three different thicknesses.

The pixel electrode PXL may be disposed on the planarization layer 226, wherein the pixel electrode PXL may be electrically connected to the transistor disposed underneath the planarization layer 226 through the holes H1a and H1b formed in the planarization layer 226.

Here, an auxiliary electrode 227 may be disposed inside and around the holes H1a and H1b on the pixel electrode PXL. The auxiliary electrode 227 may be formed of, for example, the same material as the material constituting the source/drain electrode of the transistor. Thus, such an arrangement of the auxiliary electrode 227 inside and around the holes H1a and H1b enables improvement of the generating and sensing performance of the ultrasonic waves.

A second protective layer 228 may be disposed on the pixel electrode PXL and the auxiliary electrode 227, and the piezoelectric material 240 may be disposed on the second protective layer 228. The second protective layer 228 can prevent the piezoelectric material 228 from directly contacting the pixel electrode PXL or the auxiliary electrode 227, thereby preventing the piezoelectric material 228 from being corroded.

The piezoelectric material 240 disposed on the second protective layer 228 may be formed, for example, with its flat upper surface.

Then, the thickness of the planarization layer 226 disposed under the piezoelectric material 240 may be variable depending on the pixels, so the thickness of the piezoelectric material 240 may vary depending on the pixels. For example, the thickness of the piezoelectric material 240 disposed in the pixel in column A is t1, and the thickness of the piezoelectric material 240 disposed in the pixel in column B is t2, wherein t2 may be less than t1.

Further, the common electrode COM may be disposed on the piezoelectric material 240.

As the thickness of the piezoelectric material 240 disposed in the pixel of column A and the thickness of the piezoelectric material 240 disposed in the pixel of column B are different from each other, it is possible to generate the ultrasonic waves in different frequency bands from the pixels of column A and the pixels of column B.

In other words, as the thickness of the piezoelectric material 240 disposed in the pixels in column A is larger than the thickness of the piezoelectric material 240 disposed in the pixels in column B, the pixels in column A can generate the ultrasonic waves in a lower frequency band than the pixels in column B. Likewise, as the thickness of the piezoelectric material 240 disposed in the pixels in column B is smaller than the thickness of the piezoelectric material 240 disposed in the pixels in column A, the pixels in column B can generate the ultrasonic waves in a higher frequency band than the pixels in column A.

For example, when the thickness of the piezoelectric material 240 is approximately 9 μm, the frequency of ultrasonic waves generated may be approximately 10 MHz. In such a case, the piezoelectric material 240 disposed in the pixels in column A may be arranged to have a thickness of approximately 11 μm to generate 8 MHz of ultrasonic waves. Then, the piezoelectric material 240 disposed in the pixels in column B may be disposed to have a thickness of approximately 7 μm so that the ultrasonic waves at approximately 12 MHz can be generated.

Therefore, adjusting the thickness of the piezoelectric material 240 disposed in the ultrasonic sensor 200 enables generating of the ultrasonic waves in the frequency range of 8 MHz to 12 MHz, and sensing information in a wide range of frequency bands as well.

Furthermore, the arrangement of the common electrode COM disposed on the piezoelectric material 240 in a split structure enables adjusting a generating period of the ultrasonic waves in various frequency bands according to the arranged structure of the common electrode COM.

Figure 5A:
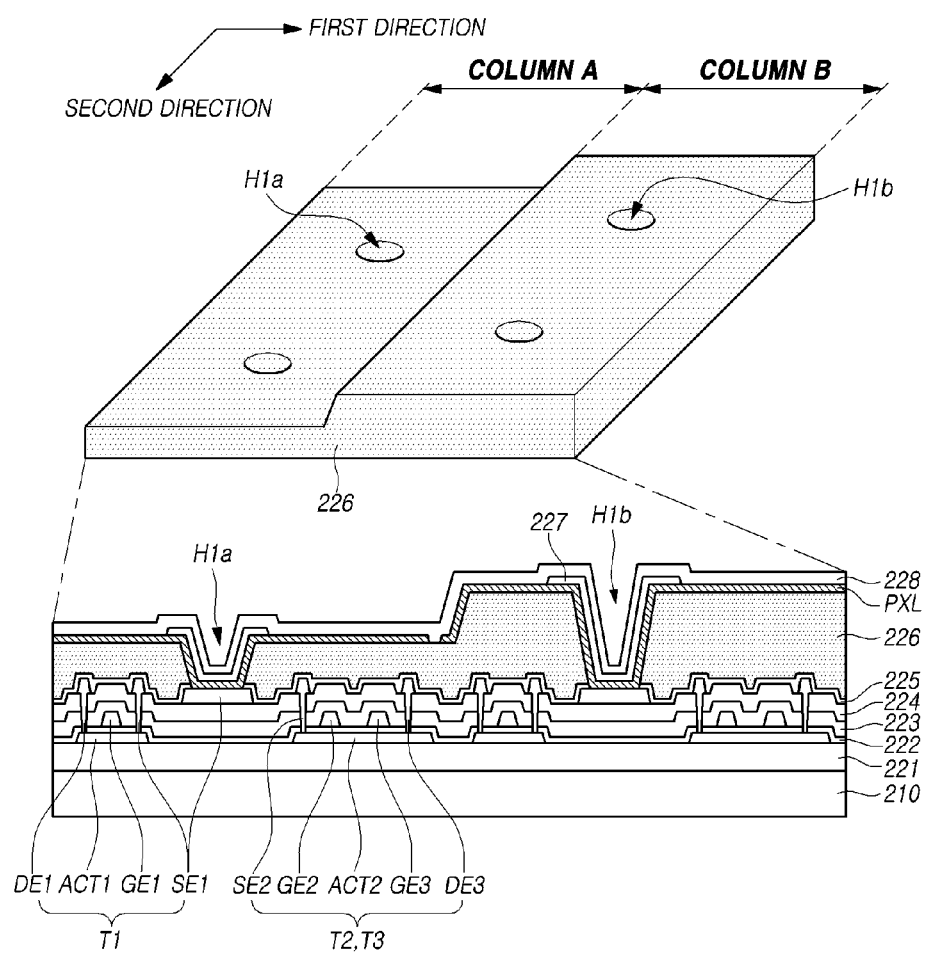
FIGS. 5A to 5C each illustrate an example of a fabrication process of the ultrasonic sensor having the cross-sectional structure as shown in FIG. 4 and an arrangement of a common electrode according to embodiments of the present disclosure.
Figure 5B:
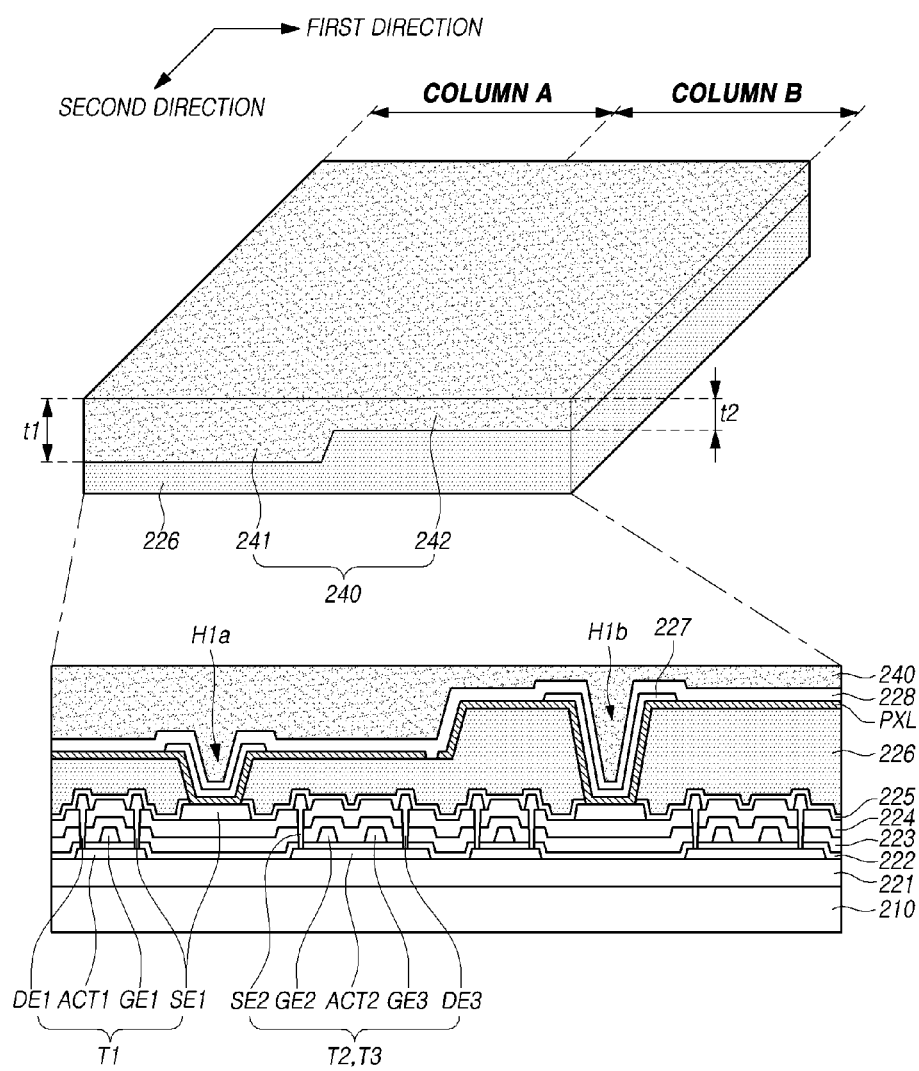
Figure 5C:
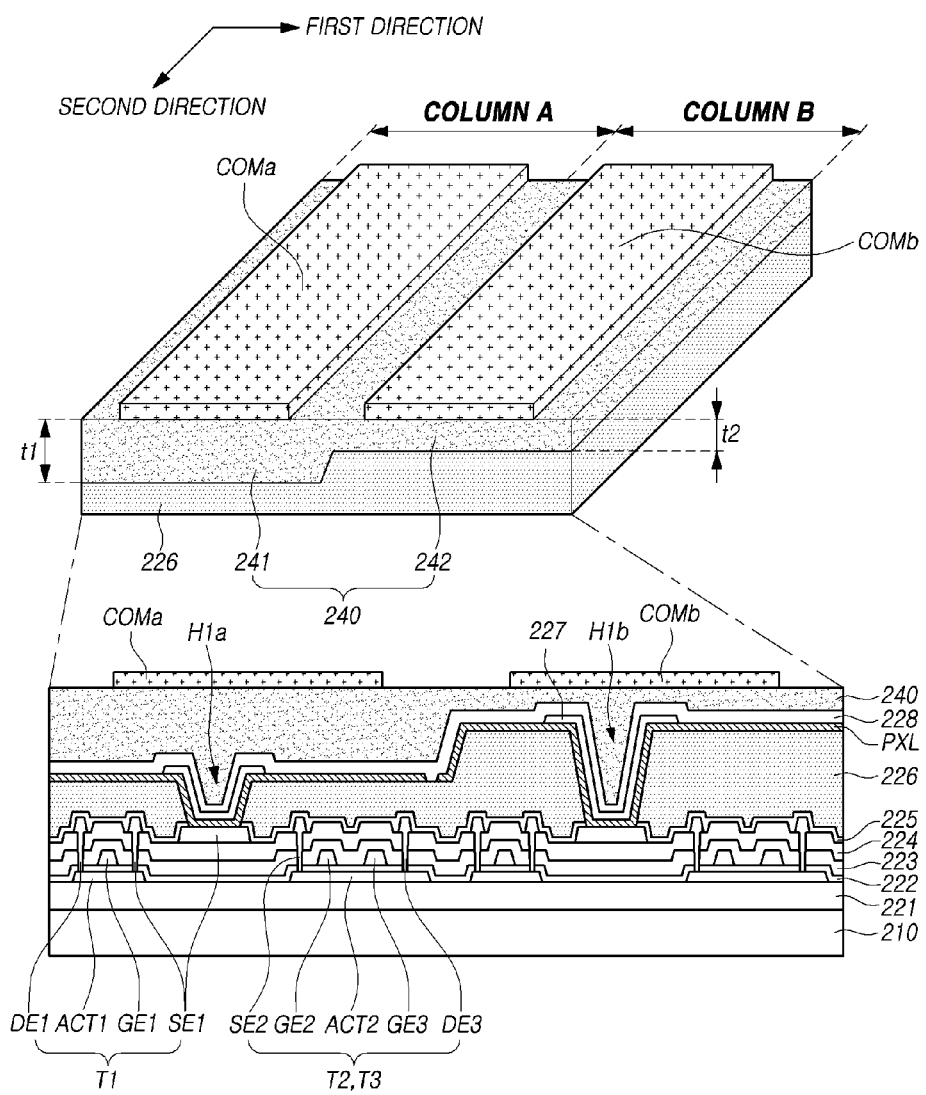

FIGS. 5A to 5C each illustrate an example of a fabrication process of the ultrasonic sensor 200 with the cross-sectional structure as shown in FIG. 4, and the arrangement of the common electrode thereof.

Referring now to FIG. 5A, after the transistors T1, T2, and T3 are disposed on the substrate 210, a planarization layer 226 is disposed thereon, wherein the thickness of the planarization layer 226 disposed in the column A may be smaller than the thickness of the planarization layer 226 disposed in the column B. Thus, the planarization layer 226 may be disposed with different thicknesses or heights along the first direction.

After disposing the planarization layer, holes H1a and H1b may be formed for electrical connection to the pixel electrode PXL disposed on the planarization layer 226 and the transistor disposed beneath the planarization layer 226.

Referring then to FIG. 5B, the pixel electrode PXL, the auxiliary electrode 227, the second protective layer 228, and others may be disposed on the planarization layer 226, and the piezoelectric material 240 may be then disposed thereon.

Here, the upper surface of the piezoelectric material 240 may be disposed in a flat shape. Accordingly, the thickness t1 of the first portion 241 of the piezoelectric material 240 disposed in the column A with a relatively smaller thickness of the planarization layer 226 may be greater than the thickness t2 of the piezoelectric material 240 disposed in the column B with a relatively larger thickness of the planarization layer 226.

Thus, the piezoelectric material 240 may be disposed to have different thicknesses along the first direction.

Referring then to FIG. 5C, the common electrode COM may be disposed on the piezoelectric material 240.

Here, the common electrode COM disposed on the piezoelectric material 240 may be arranged in a split form.

For example, a common electrode COMa disposed in column A and a common electrode COMb disposed in column B may be disposed in a split form. That is, the common electrodes COM arranged in adjacent pixels along the first direction may be separated from each other, while the common electrodes COM disposed in adjacent pixels along the second direction may be connected to each other.

Such arrangement of the common electrodes COM as shown in the above example of the pixel array enables generation and sensing of the ultrasonic waves in a unit of columns. In this arrangement, as the thicknesses of the piezoelectric materials 240 disposed in the same column are the same, the ultrasonic waves in different frequency bands can be generated in different periods.

In other words, when it is driven the column A with a larger thickness of the piezoelectric material 240, the ultrasonic wave in a lower frequency band can be generated and its sensing then performed, while when it is driven the column B with a smaller thickness of the piezoelectric material 240, the ultrasonic wave in a higher frequency band can be generated and its sensing then performed.

Alternatively, an arrangement may be made in such a structure that the common electrodes COM are connected along the direction that the thickness of the piezoelectric material 240 changes, so the ultrasonic waves in different frequency bands can be generated in the same period.

Figure 6A:
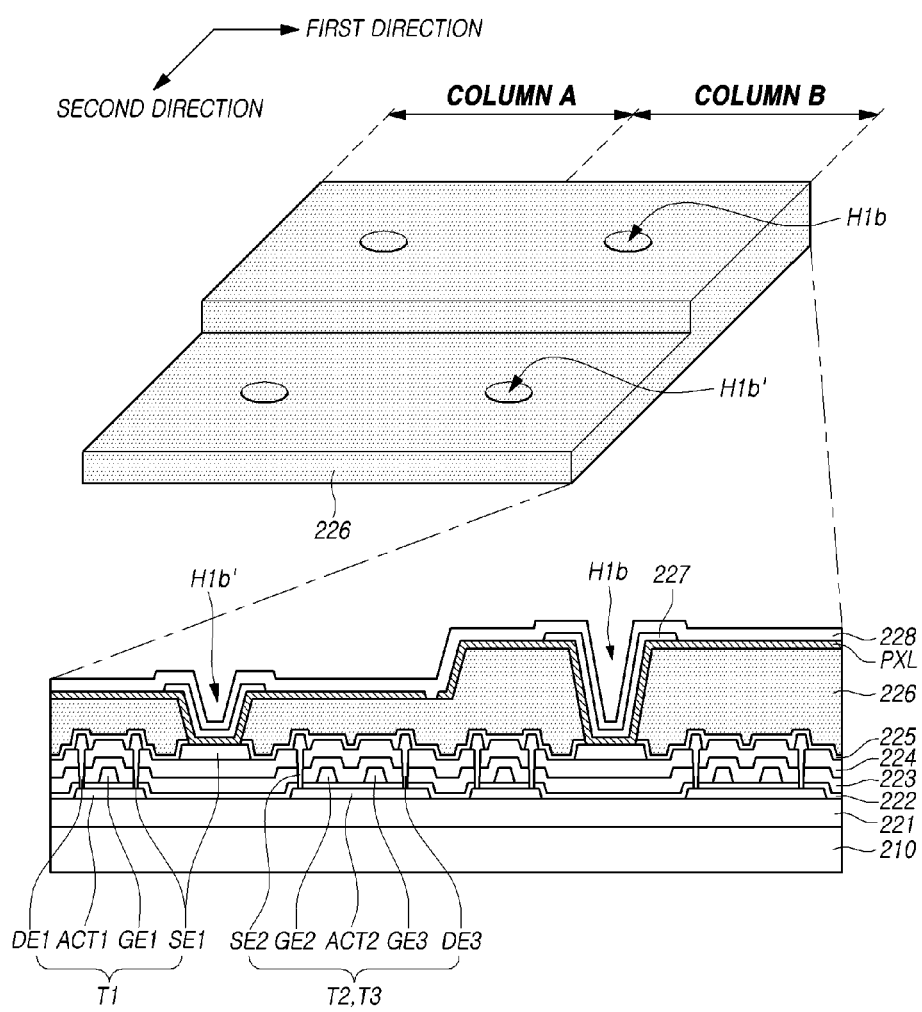
FIGS. 6A to 6C each illustrate another example of a fabrication process of the ultrasonic sensor having the cross-sectional structure as shown in FIG. 4 and an arrangement of a common electrode according to embodiments of the present disclosure.
Figure 6B:
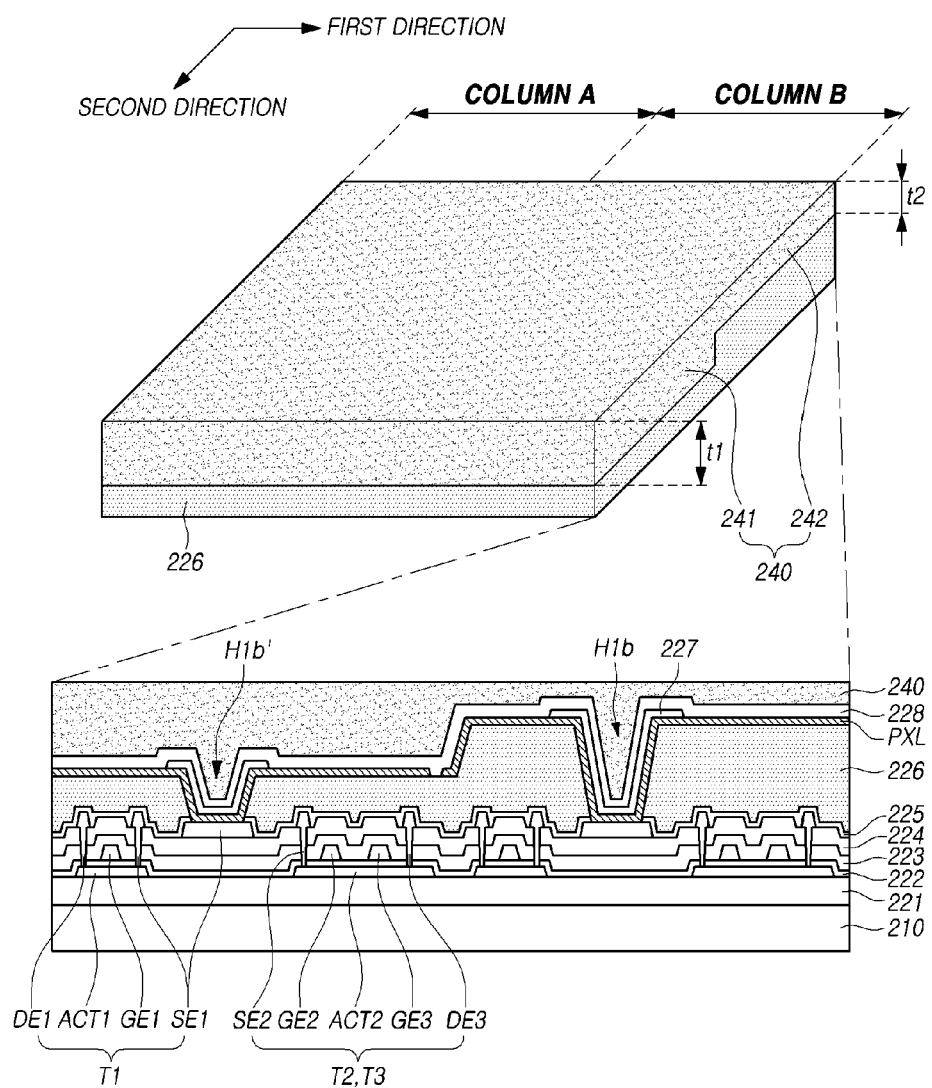
Figure 6C:
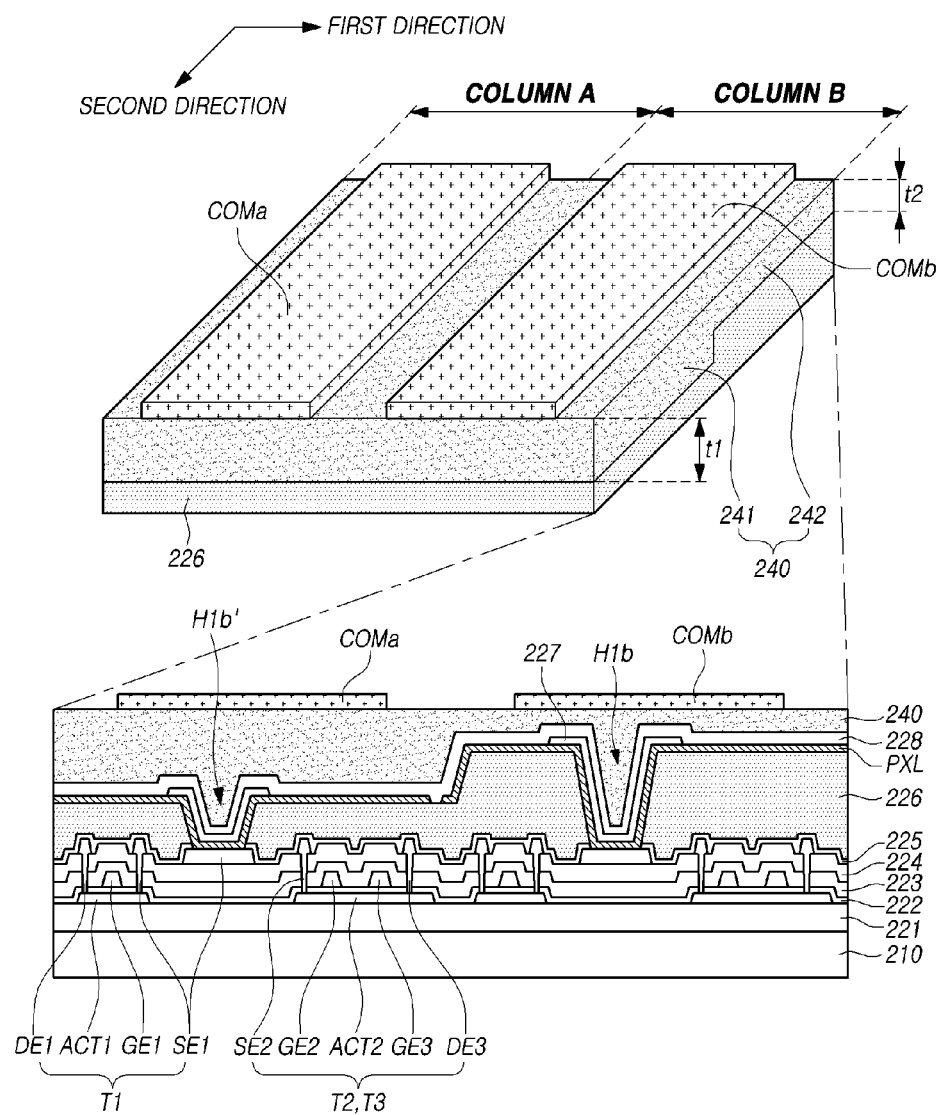

FIGS. 6A to 6C are views illustrating another example of a fabrication process of an ultrasonic sensor 200 having the cross-sectional structure as shown in FIG. 4 and the arrangement of the common electrode COM.

Referring first to FIG. 6A, after disposing the transistors T1, T2, and T3 on the substrate 210, the planarization layer 226 is disposed.

Here, the thickness of the planarization layer 226 disposed in column A may be different in the second direction, and further, the thickness of the planarization layer 226 disposed in column B may be different in the second direction. That is, both the planarization layer 226 disposed in column A and the planarization layer 226 disposed in column B may have different thicknesses or heights along the second direction.

Once the planarization layer 226 has been disposed, holes H1b and H1b are formed for electrical connection to the pixel electrode PXL to be disposed on the planarization layer 226 and the transistor disposed beneath the planarization layer 226.

Referring then to FIG. 6B, a pixel electrode PXL, an auxiliary electrode 227 and a protective layer 228 may be disposed on the planarization layer 226, and a piezoelectric material 240 may be disposed thereon.

Here, as the thickness of the planarization layer 226 is differently formed along the second direction, the thickness of the piezoelectric material 240 may be correspondingly different along the second direction. Thus, the piezoelectric material 240 is formed to extend with the same thickness in the first direction, while the thicknesses of the piezoelectric materials 240 in the second direction may be variable like t1 and t2.

Referring now to FIG. 6C, it is seen that the common electrode COM may be disposed on the piezoelectric material 240, wherein the common electrode COMa disposed in column A and the common electrode COMb disposed in column B may be disposed in a separate manner from each other.

More specifically, the common electrodes COM disposed in adjacent pixels in the first direction may be arranged in a split structure from each other, while the common electrodes COM disposed in adjacent pixels in the second direction may be arranged in a connected the structure to each other.

Here, the piezoelectric material 240 is formed with different thicknesses along the second direction, and the common electrode COM is arranged to extend along the second direction. Therefore, owing to performing the generation and sensing of the ultrasonic waves in a unit of columns, as is in the above example, the first portion 241 and the second portion 242 with different thicknesses of the piezoelectric material 240 can be simultaneously driven.

Thus, the first part 241 of the piezoelectric material 240 with a thickness t1 and the second part 242 of the piezoelectric material 240 with a thickness t2 are simultaneously driven, so that the ultrasonic waves both in the lower frequency band and the higher frequency band can be generated simultaneously.

As such, it is possible to improve the performance of the ultrasonic sensor 200 to obtain information in various frequency bands, owing to generation of the ultrasonic waves in an extended frequency band in the same period of time and sensing of the generated ultrasonic waves.

Furthermore, according to the embodiments of the present disclosure, it is also possible to adjust the frequency band of the ultrasonic waves generated in each region, by adjusting the area of the common electrode COM as well as the thickness of the piezoelectric material 240. In other words, as a frequency of ultrasonic waves generated by vibration of a piezoelectric element is typically proportional to the area (or width, diameter, etc.) of an electrode to which a voltage driving the piezoelectric element is applied, the frequency band of the ultrasonic waves generated by the ultrasonic sensor 200 can be controlled, for example, by means of adjusting the area of the common electrode COM constituting the piezoelectric element.

Figure 7:
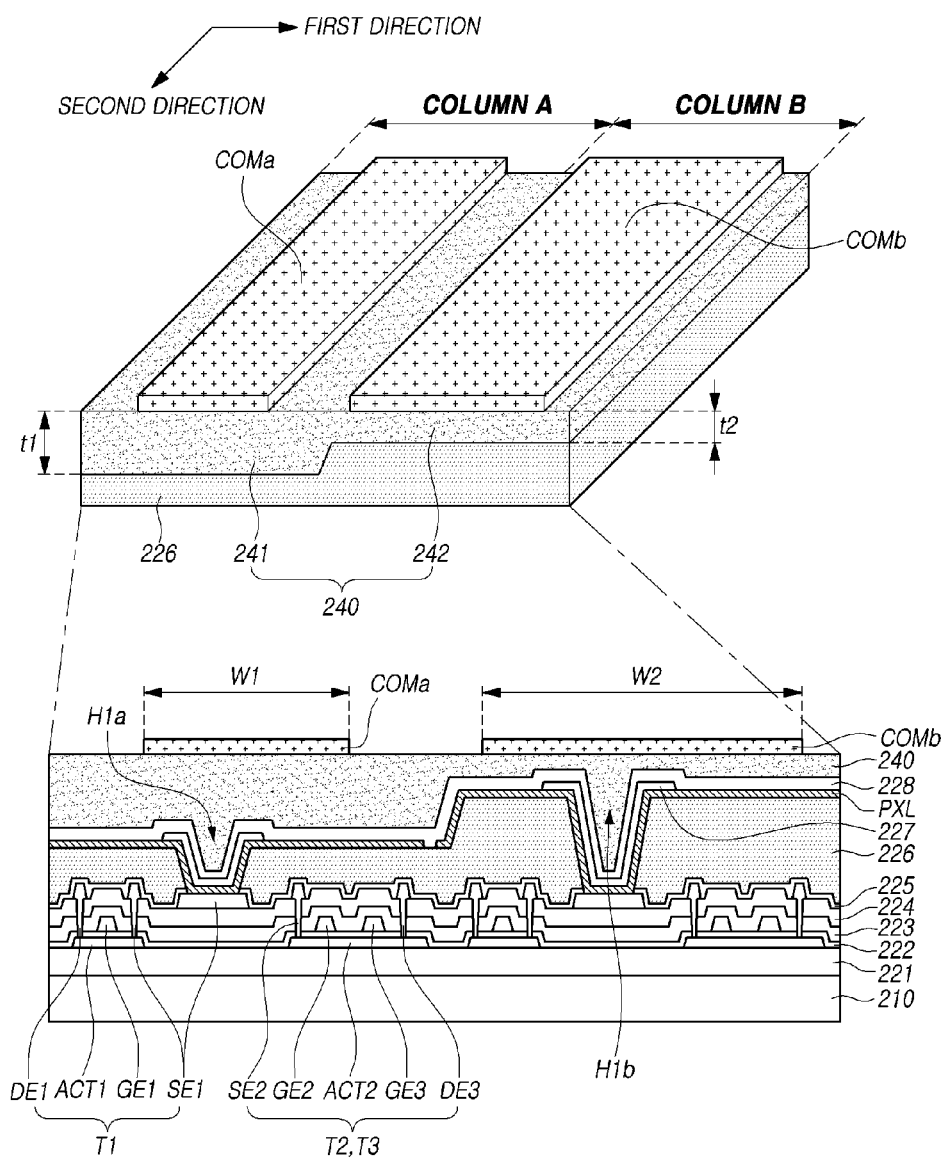
FIG. 7 illustrates an example of the structure of the common electrode disposed in the ultrasonic sensor having the cross-sectional structure as shown in FIG. 4 according to embodiments of the present disclosure.

FIG. 7 is a view illustrating an example of the structure of the common electrode COM disposed on the ultrasonic sensor 200 having the cross-sectional structure as shown in FIG. 4.

Referring to FIG. 7, the transistors T1, T2, and T3 may be disposed on the substrate 210, and the planarization layer 226 may be disposed on the transistors T1, T2, and T3.

Here, the planarization layer 226 may be formed with larger thickness in column B than in column A. Then, the pixel electrode PXL and others may be disposed on the planarization layer 226, and the piezoelectric material 240 may be then disposed thereon.

Due to the difference in thickness of the planarization layer 226, the thickness t1 of the first portion 241 of the piezoelectric material 240 disposed in column A may be greater than the thickness t2 of the second portion 242 of the piezoelectric material 240 disposed in column B.

The common electrode COM may be disposed on the planarization layer 226, wherein the common electrode COM may be formed with different areas depending on the areas to be disposed.

As an example, the area of the common electrode COMa disposed in column A may be smaller than that of the common electrode COMb disposed in column B. In more detail, the width W1 of the common electrode COMa arranged in the column A may be smaller than the width W2 of the common electrode COMb arranged in the column B.

Thus, the area of the common electrode COMa disposed on the first portion 241 of the thicker piezoelectric material 240 may be relatively smaller to generate the ultrasonic waves in the lower frequency band. Likewise, the area of the common electrode COMb disposed on the second portion 242 of the thinner piezoelectric material 240 may be relatively larger to generate ultrasonic waves in the higher frequency band.

As apparent from the foregoing, the ultrasonic waves of various frequency bands can be generated while keeping a relatively small difference in thickness of the piezoelectric material 240, by controlling the area of the common electrode COM together with the thickness of the piezoelectric material 240.

Here, the pixel electrode PXL corresponding to the common electrode COM may have a different area depending upon the area of the common electrode COM, but may be arranged to have a constant area.

That is, when receiving the ultrasonic waves, a voltage level at the pixel electrode PXL fluctuates, allowing a series of signals to be detected. Therefore, it is possible for the ultrasonic sensor to maintain the sensing performance while generating ultrasonic waves in various frequency bands, by making constant the area of the pixel electrode PXL serving to sense ultrasonic waves.

Further, in the ultrasonic sensor 200 according to the embodiments of the present disclosure, the piezoelectric material 240 with a different thickness or the common electrode COM with a different area may be arranged in an alternate manner for each pixel as circumstances require.

Figure 8:
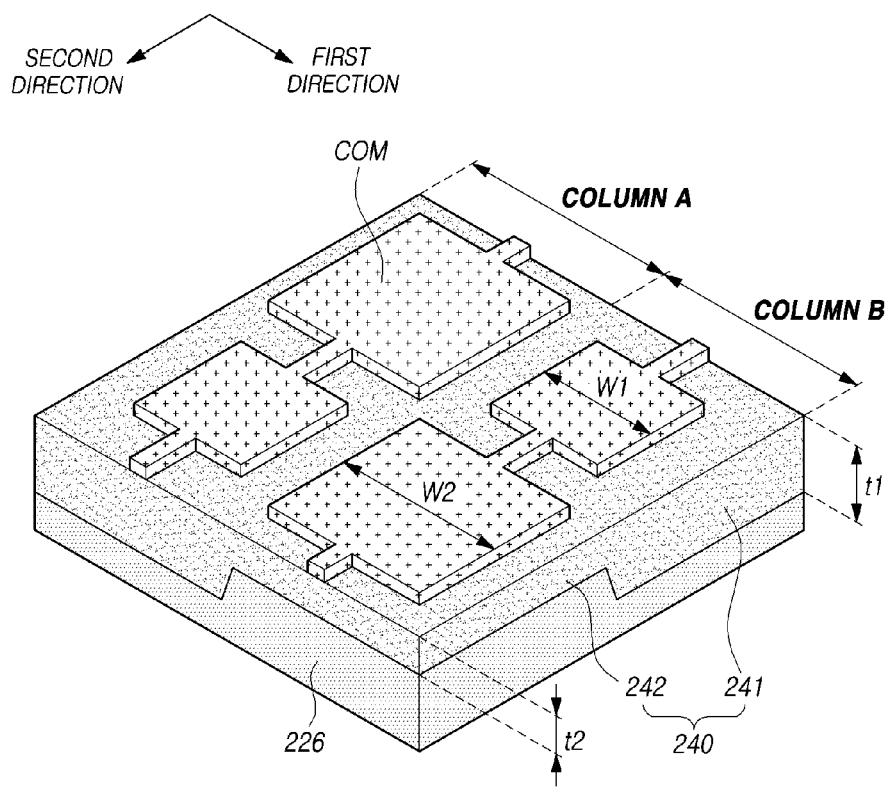
FIG. 8 illustrates another example of the structure of the common electrode disposed in the ultrasonic sensor having the cross-sectional structure as shown in FIG. 4 according to embodiments of the present disclosure.

FIG. 8 illustrates another example of the structure of the common electrode COM disposed in the ultrasonic sensor 200 having the cross-sectional structure as shown in FIG. 4.

Referring to FIG. 8, the planarization layer 226 disposed in column A may be formed with a different thickness along the second direction, and the planarization layer 226 disposed in column B may also be formed with a different thickness along the second direction. Here, the thicknesses of the planarization layer 226 extending in adjacent columns A and B in the first direction may be different from each other.

In other words, the planarization layers 226 with different thicknesses may be arranged alternatingly for each pixel.

Furthermore, as the thicknesses of the planarization layers 226 are different from each other for each adjacent pixel, the thicknesses of the piezoelectric materials 240 disposed on the planarization layers 226 may accordingly be different from each other for each adjacent pixel.

Therefore, the first portion 241 of the piezoelectric material 240 with a thickness t1 and the second portion 242 of the piezoelectric material 240 with a thickness t2 may be arranged in an alternating manner for each pixel.

In addition, the area of the common electrode COM disposed on the piezoelectric material 240 may be different according to the thickness of the piezoelectric material 240.

For instance, the width W1 of the common electrode COM disposed on the first portion 241 of the piezoelectric material 240 with the thickness t1 may be smaller than the width W2 of the common electrode COM disposed on the second portion 242 of the piezoelectric material 240 with the thickness t2.

That is to say, the common electrode COM of the smaller area may be disposed on the piezoelectric material 240 of the larger thickness, while the common electrode COM of the larger area may be disposed on the piezoelectric material 240 of the smaller thickness.

Accordingly, the ultrasonic sensor can generate a higher frequency band of ultrasonic wave in a pixel with a wider common electrode COM disposed on a thin piezoelectric material 240, and a lower frequency band of ultrasonic wave in a pixel with a narrower common electrode COM disposed on a thicker piezoelectric material 240, thereby enabling the generation of ultrasonic waves in various frequency bands as well as sensing of information in various frequency domains.

As described above, the ultrasonic sensor 200 according to the embodiments of the present disclosure can significantly improve the sensing capability by performing the ultrasonic generation and sensing in various frequency bands owing to application of various structures in which the piezoelectric material 240 is formed with different thicknesses, and accordingly provide both the functions of fingerprint sensor and proximity sensor, as well.

Figure 9:
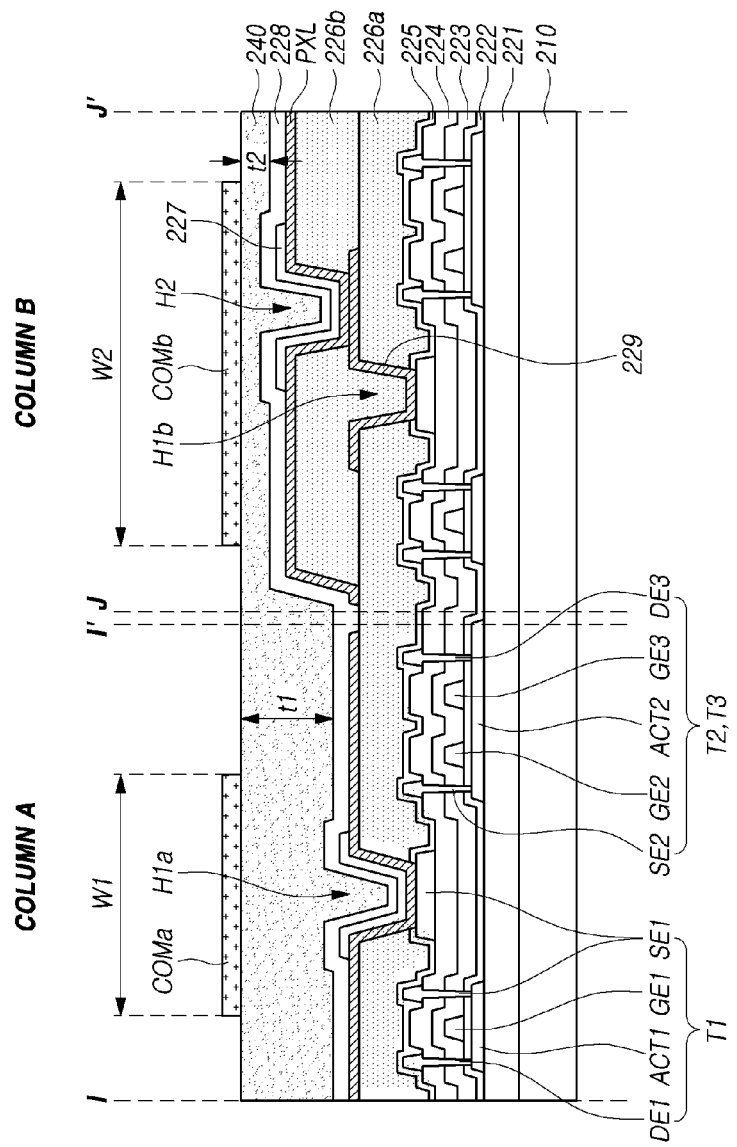
FIG. 9 illustrates another example of the cross-sectional structure of I-I' and J-J' portions in the thin film transistor array as shown in FIG. 3 according to embodiments of the present disclosure.

FIG. 9 illustrates another example of a cross-sectional structure of I-I' portion and J-J' portion of the thin film transistor array 220 as shown in FIG. 3.

Referring to FIG. 9, the transistors T1, T2, and T3 may be disposed on the substrate 210, and the planarization layer may be disposed on the transistors T1, T2, and T3.

Here, the planarization layer may be formed to have different thicknesses according to the local region, through the halftone mask process as in the above-described example, or it may be formed to have a different thickness by way of a process of disposing the planarization layer two times.

As an example, once the arrangement of the first protective layer 225 on the transistors T1, T2, and T3 has been completed, the first planarization layer 226a may be disposed thereon. Then, the holes H1a and H1b may be formed in the first planarization layer 226a.

A connecting electrode 229 may be disposed in the hole H1b located in an area where the thinner piezoelectric material 240 is disposed, of the holes H1a and H1b formed in the first planarization layer 226a. Here, the connection electrode 229 may be of the same material as the pixel electrode PXL, or on some occasions, of the same material as the auxiliary electrode 227.

A second planarization layer 226b may be disposed only in an area where the thin piezoelectric material 240 is disposed on the first planarization layer 226a.

Then, a hole H2 may be formed in the second planarization layer 226b, and the pixel electrode PXL and the auxiliary electrode 227 may be then disposed in the hole H2.

Here, at least part of the hole H2 formed in the second planarization layer 226b may be located in a region other than the region in which the hole H1b formed in the first planarization layer 226a is disposed.

Thus, the hole H2 of the second planarization layer 226b can be disposed so that at least part of the hole H2 does not overlap with the hole H1b of the first planarization layer 226a. Further, the hole H2 of the second planarization layer 226b may be disposed to overlap at least part of a connecting electrode 229 disposed inside and around the hole H1b of the first planarization layer 226a.

Accordingly, the pixel electrode PXL disposed in the hole H2 of the second planarization layer 226b may be electrically connected to a transistor disposed underneath the first planarization layer 226a through the connecting electrode 229.

In this way, the pixel electrode PXL may be connected to the transistor through the hole H1b of the first planarization layer 226a and the hole H2 of the second planarization layer 226b, thereby making it possible to prevent the hole in the planarization layer 226 from growing in size in its thick portion.

Therefore, the holes disposed underneath the portion having a different thickness of the piezoelectric material 240 are adapted to have a constant size, so that the size of the holes in which the piezoelectric material 240 is disposed may not affect the frequency range.

Figure 10:
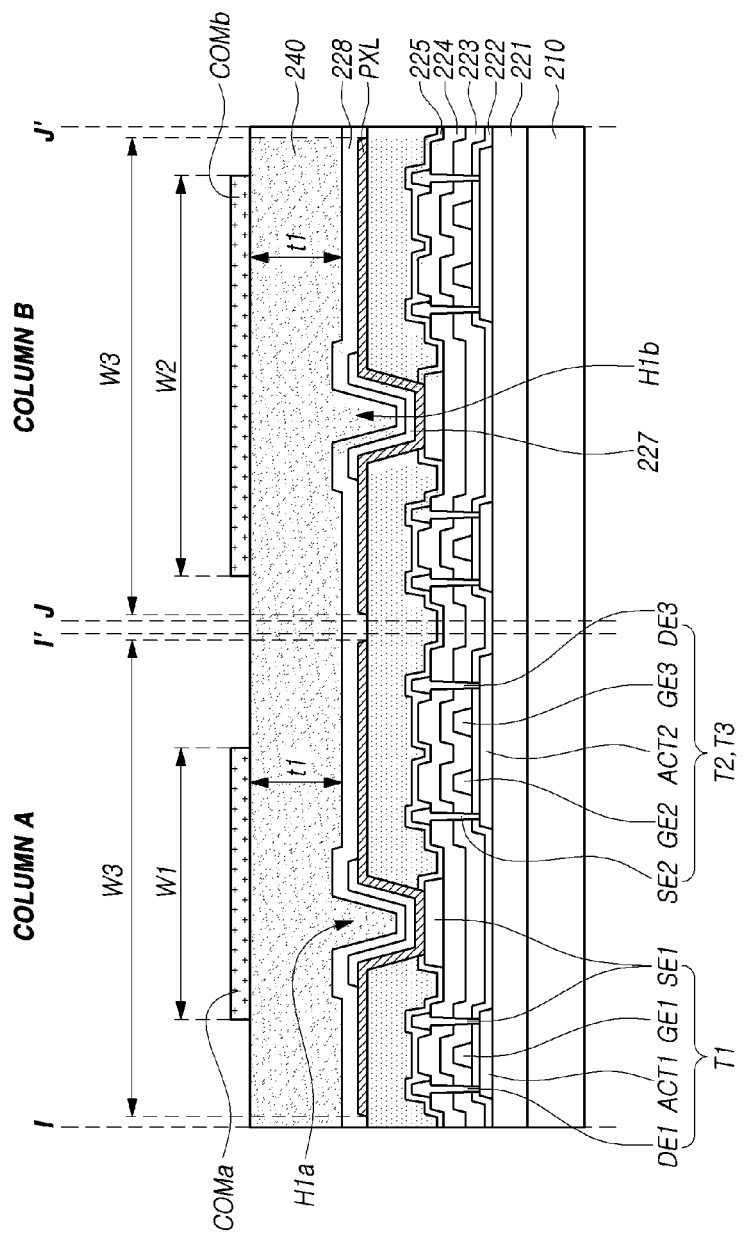
FIG. 10 illustrates still another example of the cross-sectional structure of I-I' and J-J' portions in the thin film transistor array as shown in FIG. 3 according to embodiments of the present disclosure.

FIG. 10 illustrates still another example of the cross-sectional structure of I-I' and J-J' portions in the thin film transistor array 220 as shown in FIG. 3.

Referring to FIG. 10, the thickness of the piezoelectric material 240 disposed in each pixel may be kept constant, and the area of the common electrode COM disposed on the piezoelectric material 240 may be controlled to generate the ultrasonic waves in various frequency bands.

For example, the thicknesses of the piezoelectric material 240 disposed in columns A and B may be all constant as t1.

Further, the width W1 of the common electrode COMa disposed on the piezoelectric material 240 in column A may be smaller than the width W2 of the common electrode COMb disposed on the piezoelectric material 240 in column B. That is, the common electrode COMa with a smaller area may be disposed in column A, while the common electrode COMb with a large area may be disposed in column B.

Therefore, the piezoelectric material 240 driven in column A can generate the ultrasonic waves in the lower frequency band, while the piezoelectric material 240 driven in column B can generate the ultrasonic waves in the higher frequency band. As apparent from the foregoing, the ultrasonic waves in various frequency bands can be generated by adjusting the area of the common electrode COM disposed in the pixel.

In this case, the widths of the pixel electrodes PXL arranged in both columns A and B can be made constant to W3. As such, the area of the pixel electrode PXL can be made constant to keep the sensing performance effective, while expanding the frequency band of the ultrasonic waves generated with different areas of the common electrode COM.

As described above, the embodiments of the present disclosure provide the ultrasonic sensor 200 that can generate the ultrasonic waves in various frequency bands and obtain the information in various frequency domains, by allowing to adjust at least one of the area of the common electrode COM and the thickness of the piezoelectric material 240 disposed in the pixels of the ultrasonic sensor 200.

Figure 11:
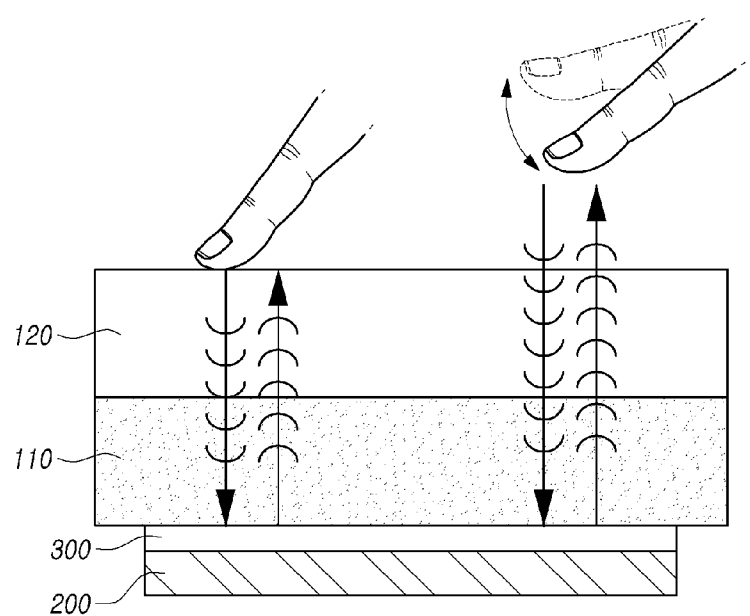
FIG. 11 is a schematic diagram illustrating an example of a method in which the ultrasonic sensor according to embodiments of the present disclosure performs the fingerprint sensing and the proximity sensing.

FIG. 11 illustrates, by way of an example, a scheme in which the ultrasonic sensor 200 according to embodiments of the present disclosure performs the fingerprint sensing function and the proximity gesture sensing function.

Referring to FIG. 11, the ultrasonic sensor 200 may be disposed on the opposite side of the cover glass 120 of the display panel 110. Hence, the ultrasonic sensor 200 can generate the ultrasonic waves in various frequency bands by adjusting the thickness of the piezoelectric material 240 and/or the area of the common electrode COM.

Accordingly, it will be appreciated that the ultrasonic sensor 200 according to the embodiments of the present disclosure can perform both the fingerprint sensing using the ultrasonic wave in a higher frequency band and the proximity sensing of a finger using the ultrasonic wave in a lower frequency band.

Moreover, the area of the pixel electrode PXL corresponding to the sensing node Ns can be made constant for each pixel, so that the sensing sensitivity can be uniformly maintained while carrying out the sensing for various frequency bands.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. An ultrasonic sensor comprising:
   a substrate;
   a plurality of thin film transistors, each of the plurality of thin film transistors disposed in corresponding one of a plurality of areas on the substrate;
   a planarization layer disposed on the plurality of thin film transistors, the planarization layer including a plurality of holes;
   a plurality of first electrodes, each of the plurality of first electrodes disposed in a corresponding one of the plurality of areas on the planarization layer and electrically connected to a corresponding one of the plurality of thin film transistors through a corresponding one of the plurality of holes;
   a piezoelectric material disposed on the planarization layer and the plurality of first electrodes, the piezoelectric material including a first portion in a first area from the plurality of areas and a second portion in a second area from the plurality of areas where the first portion and the second portion are non-overlapping with one of the plurality of holes that is disposed in the first area and the second area, the first portion having a first thickness and the second portion having a second thickness that is less than the first thickness; and
   at least one second electrode disposed on the piezoelectric material.

2. The ultrasonic sensor according to claim 1, wherein a thickness of a first portion of the planarization layer that is disposed under the first portion of the piezoelectric material is less than a thickness of a second portion of the planarization layer that is disposed under the second portion of the piezoelectric material.

3. The ultrasonic sensor according to claim 1, wherein an area of a first portion of the second electrode disposed on the first area in which the first portion of the piezoelectric material is disposed is less than an area of a second portion of the second electrode disposed on the second area in which the second portion of the piezoelectric material is disposed.

4. The ultrasonic sensor according to claim 3, wherein an area of a first one of the plurality of first electrodes that is disposed underneath the first portion of the piezoelectric material is substantially the same as an area of a second one of the plurality of first electrodes that is disposed underneath the second portion of the piezoelectric material.

5. The ultrasonic sensor according to claim 1, wherein the first portion of the piezoelectric material and the second portion of the piezoelectric material are alternately arranged for each of the plurality of areas arranged along at least one of a first direction and a second direction that intersects the first direction.

6. The ultrasonic sensor according to claim 5, wherein the first portion of the piezoelectric material and the second portion of the piezoelectric material are alternately arranged for each of the plurality of areas disposed along the first direction, and
   wherein the at least one second electrode includes a plurality of second electrodes that are arranged in the plurality of areas adjacent in the first direction and spaced apart from each other, and the plurality of second electrodes arranged in the plurality of areas adjacent in the second direction are connected to each other.

7. The ultrasonic sensor according to claim 5, wherein the first portion of the piezoelectric material and the second portion of the piezoelectric material are alternately arranged for each of the plurality of areas disposed along the first direction, and
   wherein the at least one second electrode includes a plurality of second electrodes that are arranged in the plurality of areas adjacent in the first direction are connected to each other, and the plurality of second electrodes arranged in the plurality of areas adjacent in the second direction are spaced apart from each other.

8. The ultrasonic sensor according to claim 5, wherein the first portion of the piezoelectric material and the second portion of the piezoelectric material are alternately arranged for each of the plurality of areas disposed along the first direction and are alternately arranged for each of the plurality of areas disposed along the second direction, and
   wherein an area of a first portion of the second electrode disposed on the first area in which the first portion of the piezoelectric material is disposed is less than an area of a second portion of the second electrode disposed on the second area in which the second portion of the piezoelectric material is disposed.

9. The ultrasonic sensor according to claim 1, wherein the planarization layer comprises:
   a first planarization layer disposed on the plurality of thin film transistors, the first planarization layer including a plurality of first holes; and
   a second planarization layer disposed between the second portion of the piezoelectric material and the first planarization layer, the second planarization layer including a plurality of second holes,
   wherein at least some of the plurality of second holes are non-overlapping with the plurality of first holes.

10. The ultrasonic sensor according to claim 9, wherein a first electrode from the plurality of first electrodes that is disposed underneath the second portion of the piezoelectric material is electrically connected to a corresponding one of the plurality of thin film transistors through a connecting electrode disposed in one of the plurality of first holes.

11. The ultrasonic sensor according to claim 1, wherein the first portion of the piezoelectric material is overlapped by both the at least one second electrode and one of the plurality of first electrodes.

12. The ultrasonic sensor according to claim 1, wherein one of the plurality of first electrodes disposed under the first portion is insulated from another one of the plurality of first electrodes disposed under the second portion.

13. An ultrasonic sensor comprising:
    a plurality of first electrodes, each of the plurality of first electrodes disposed in a corresponding one of a plurality of areas;
    at least one second electrode disposed on the plurality of areas; and
    a piezoelectric material disposed between the plurality of first electrodes and the second electrode,
    wherein an area of a first portion of the second electrode disposed in a first area of the plurality of areas is smaller than an area of a second portion of the second electrode disposed in a second area of the plurality of areas, and an area of a first one of the plurality of first electrodes that is disposed in the first area is substantially the same as an area of a second one of the plurality of first electrodes disposed in the second area.

14. The ultrasonic sensor according to claim 13, wherein a thickness of a thinnest portion of the piezoelectric material disposed in the first area is greater than a thickness of a thinnest portion of the piezoelectric material disposed in the second area.

15. The ultrasonic sensor according to claim 14, further comprising:
   a planarization layer disposed underneath the plurality of first electrodes, the planarization layer including a plurality of holes,
   wherein a thickness of a thickest portion of the planarization layer disposed in the first area is less than a thickness of a thickest portion of the planarization layer disposed in the second area.

16. The ultrasonic sensor according to claim 13, wherein the first area and the second area are alternately arranged along at least one of a first direction and a second direction that intersects the first direction.

17. The ultrasonic sensor according to claim 13, wherein a portion of the second electrode disposed in the first area and a portion of the second electrode disposed in the second area are connected to each other.

18. A display device comprising:
   a display panel; and
   an ultrasonic sensor equipped within the display panel or disposed on at least one surface of the display panel, the ultrasonic sensor comprising:
   a substrate;
   a plurality of thin film transistors, each of the plurality of thin film transistors disposed in corresponding one of a plurality of areas on the substrate;
   a planarization layer disposed on the plurality of thin film transistors, the planarization layer including a plurality of holes;
   a plurality of first electrodes, each of the plurality of first electrodes disposed in a corresponding one of the plurality of areas on the planarization layer and electrically connected to a corresponding one of the plurality of thin film transistors through a corresponding one of the plurality of holes;
   a piezoelectric material disposed on the planarization layer and the plurality of first electrodes, the piezoelectric material including a first portion in a first area from the plurality of areas and a second portion in a second area from the plurality of areas where the first portion and the second portion are non-overlapping with one of the plurality of holes that is disposed in the first area and the second area, the first portion having a first thickness and the second portion having a second thickness that is less than the first thickness; and
   at least one second electrode disposed on the piezoelectric material.

19. The display device according to claim 18, wherein the ultrasonic sensor is configured to generate a first frequency band of ultrasonic wave and a second frequency band of ultrasonic wave for a same period of time.

20. The display device according to claim 18, wherein the ultrasonic sensor is configured to generate a first frequency band of ultrasonic wave for a first period of time and a second frequency band of ultrasonic wave for a second period of time that is non-overlapping with the first period of time.

* * * * *